Oct. 27, 1964 S. W. GLOVER 3,153,828
TRIANGULAR D
Filed Nov. 28, 1962

SHELDON W. GLOVER,
INVENTOR.

BY *Lyon & Lyon*
ATTORNEYS.

United States Patent Office 3,153,828
Patented Oct. 27, 1964

3,153,828
TRIANGULAR D
Sheldon W. Glover, 2025 W. 35th St., San Pedro, Calif., assignor of fifty percent to Alvah H. Cooper, Jr., Duarte, Calif.
Filed Nov. 28, 1962, Ser. No. 240,517
13 Claims. (Cl. 24—123)

This invention relates to equipment for hoisting or handling various objects and more particularly relates to an improved triangular D for use with flat or webbed slings.

In the hoisting and handling of various objects, particularly cylindrical ones, it has been found convenient to use slings of flat or webbed material in order to better distribute and balance the load. A number of devices have been proposed for supporting these webbed slings from a hook or other lifting member, the most popular being what is known as a triangular D. This triangular D generally takes the form of a bar of suitable metal such as steel bent in the form of an isosceles triangle and the ends welded together. The webbing is then distributed across the base of the triangle and the hook or other lifting member attached at the apex.

This type of web supporting member has several disadvantages. First, because of its rigidity it cannot shift slightly relative to the hook to better balance the load. Second, and more importantly, the load transmitted through the webbing acts on the base of the D as if it was a simple beam and thus tends to distort it. The only solution thus far proposed for this problem is to construct the D of extremely heavy material to enable them to structurally withstand the forces set up.

According to the present invention, it has now been found that a triangular D may be provided which better distributes the forces transmitted by the webbing to the member it engages and which presents a flexible material to the hook or other lifting member so that slight shifting may take place to better balance the load. To accomplish these results, the structure of the present invention utilizes a flexible cable in combination with a spreader for supporting the webbing, the spreader being so designed that the webbing exerts essentially only compressional forces on it. This enables the spreader to be made of lightweight materials and considerably reduces the expense of its manufacture.

It is therefore an object of the present invention to provide an improved device for cooperating with flat or webbed slings.

It is also an object of the present invention to provide an improved triangular D for use in hoisting or handling various objects.

It is another object of the present invention to provide a triangular D having a flexible member for engaging a hook or other lifting member and a crosspiece for engaging a flat or webbed sling.

These and other objects and advantages of the present invention will become more apparent upon reference to the attached description and drawings in which.

Figure 1:
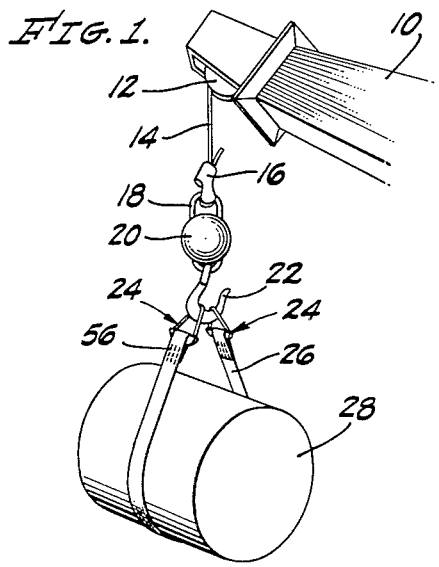
FIGURE 1 is a perspective view of a cylindrical object being lifted by means of the triangular D of the present invention.

Referring now to FIGURE 1, there is shown conventional hoisting apparatus including a boom 10 which rotationally supports a sheeve 12 on its outer end. A cable 14 depends from the sheeve 12 and terminates in a cable end fitting 16. The cable end fitting 16 supports a conventional loop 18 and weight member 20, the loop 18 having a hook 22 fastened on its lower end. The hook 22 supports a pair of triangular D's 24 according to the present invention to which are attached the ends of a webbed sling 26 for supporting a cylindrical object 28.

Figure 2:
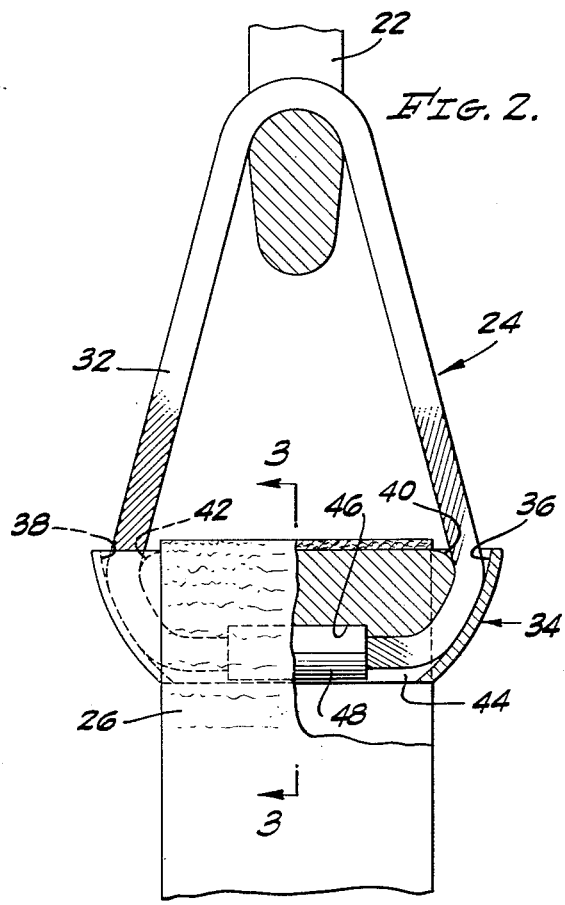
FIGURE 2 shows a front elevation, partly in section, of the triangular D of the present invention.
Figure 3:
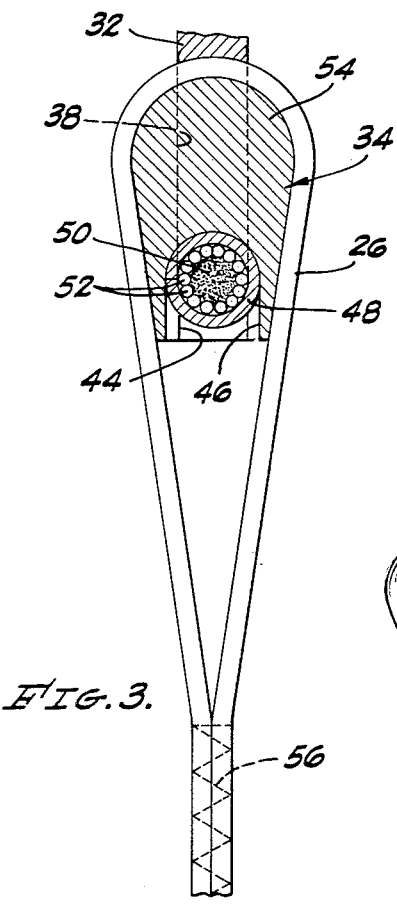
FIGURE 3 is a view taken substantially along lines 3—3 of FIGURE 2.
Figure 4:
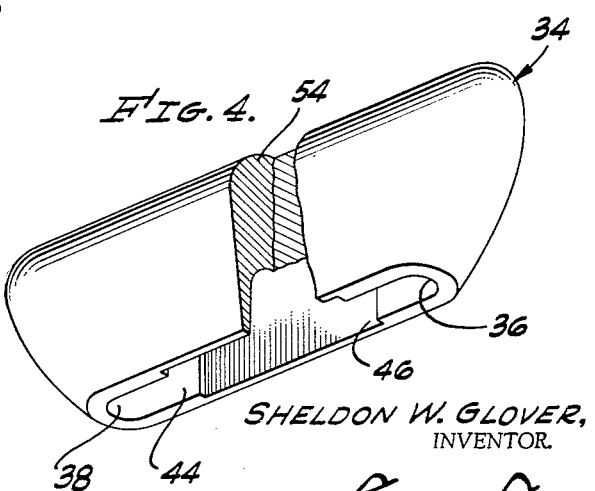
FIGURE 4 is a perspective view, partly broken away, of the crosspiece or spreader of the present invention.

The structural details of the triangular D 24 of the present invention may be seen by reference to FIGURES 2, 3, and 4. As can be seen from these figures, a suitable flexible cable 32 is passed through and supported in a spreader 34. For this purpose, the spreader 34 is provided with a curved passageway 36 at one end and a similar passageway 38 at the other end. These passageways preferably have a center of curvature located in a plane which longitudinally bisects the member and have a diameter slightly larger than the diameter of the cable so that the two ends of the cable may be inserted in the passageways 36 and 38 respectively. The upper end of the passageways 36 and 38 are provided with rounded interior shoulders 40 and 42 each having a lesser radius of curvature than the passageways to eliminate any possible shearing force on the cable 32 when it is positioned over the hook 22.

The base of the spreader 34 is cut away to provide a channel 44 through which the ends of the cable 32 may pass. The channel 44 is provided with a widened and deepened portion 46 suitable for receiving a cylindrical collar or swedge 48 of any conventional design. The swedge 48 joins the two ends of the cable 32 in the conventional manner to form an endless loop and is force-fit into the extended portion 46 of the channel 44 to prevent both vertical and lateral movement of the cable 32 in the spreader 34.

As may be seen from FIGURE 3, the cable preferably takes the form of a hemp mandrel 50 about which is wound a plurality of steel wires 52. As may also be seen from FIGURE 3, the upper portion 54 of the spreader 34 is wider than the lower portion and is curved to provide the spreader with a generally tear dropshaped cross section. This configuration enables the webbing 26 to assume its best lift angle and lessens the forces tending to pull apart the stitches or other fasteners 56.

When the webbed sling 26 is used to lift or support a load as shown in FIGURE 1, the web 26 transmits the load to the spreader 34. Unlike the devices of the prior art, however, this force is not exerted on the spreader 34 as if it was a simple beam. Rather, the spreader 34 transmits these forces to the cable 32 which thereby sustains substantially all of the tensional forces in the system. Because of the flexibility of the cable, as the force is applied the portions of the cable 32 in the passageways 36 and 38 attempt to move toward each other, thereby exerting a compressional force on the interior portion of the spreader. The webbing 26 and the portion of the cable 32 in the channel 44 also try to move toward each other resulting in further compressional forces on the interior portion of the spreader 34. However, even light metals such as aluminum can withstand great compressional forces and thus the spreader can be made of such a metal or of a suitable plastic able to sustain such compressional forces.

From the foregoing description, it may be seen that a triangular D has been provided which may be constructed of lightweight material and which is superior to the devices of the prior art for establishing a balanced load center when used with a hook or other lifting member. These advantages are obtained by using a novel spreader which is subjected to substantially only compressional forces in combination with a flexible cable which sustains substantially all the tension forces in the system. The use of such a novel design enables a triangular D to be constructed of cheaper materials without any sacrifice of strength.

The invention may be embodied in other specific forms not departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Apparatus of the type described, comprising, in combination: a length of flexible cable having two ends; a member for cooperating with said cable, said member having a passageway therein for receiving said cable, a portion of said passageway being open; means for joining the ends of said cable, said means being positioned in the open portion of said passageway; and a relatively flat and wide web of flexible material, said member having a longitudinal straight surface spaced on the opposite side of said member from said open portion for uniformly engaging said web.

2. Apparatus of the type described, comprising in combination: a length of flexible cable having two ends; a longitudinal member for cooperating with said cable, said member having a passageway at both ends thereof and a longitudinal channel connecting said passageways, said passageways and said channel receiving said cable; a means for joining the ends of said cable; a relatively flat and wide web of flexible material, said member having a longitudinal straight surface between the passageways at both ends thereof and spaced from said channel for uniformly engaging said web.

3. Apparatus of the type described, comprising in combination: a length of flexible cable having two ends; a longitudinal member having a passageway at each end for receiving the ends of said cable, said passageways being curved inwardly toward the bottom of said member, said member further having an open channel in the bottom thereof for connecting said passageways; a swedge joining the ends of said cable and positioned in said channel; a relatively flat and wide web of flexible material, said member having a longitudinal straight surface on the top thereof between said passageways at each end thereof for uniformly engaging said web.

4. A triangular D for cooperating with a lifting member and a webbed sling, comprising in combination: a length of flexible cable for engaging said lifting member and having two ends; a longitudinal member for supporting said webbed sling, said member having a passageway at each end for receiving the ends of said cable and an open channel in the bottom thereof, said passageways being curved and each having their radii of curvature located in a common plane longitudinally bisecting said member, said channel connecting the lower ends of said passageways, said member having a longitudinal straight surface between the upper ends of said passageways for uniformly engaging said webbed sling; and a swedge joining the ends of said cable and positioned in said channel.

5. The apparatus of claim 4 wherein said channel has a broadened portion intermediate the ends thereof and said swedge is force fit in said broadened portion.

6. The apparatus of claim 4 wherein the upper portions of said passageways are provided with inner shoulders having a lesser radius of curvature than said passageways.

7. The apparatus of claim 5 wherein said longitudinal member is thicker at the top than at the bottom, and is provided with a laterally curved upper surface whereby said member has a generally teardrop-shaped cross section.

8. In an apparatus for transmitting tension forces from a relatively flat and wide flexible web to a hook or the like, the combination of: a length of flexible cable having its ends connected end-to-end to form a continuous loop, a longitudinally elongated and laterally narrow member having top and bottom portions and having a passageway at each longitudinal end thereof, a portion of said cable extending through and between said passageways and positioned immediately adjacent and engaging said bottom portion, the remainder of said cable forming a loop above the said top portion of the member for engaging the hook, said top portion having a longitudinally straight surface between said passageways, and a portion of said flat web encircling the laterally narrow direction of said member and engaging said straight surface in surface contact relation for uniformly transmitting downward force from said web to said member.

9. In an apparatus for transmitting tension forces from a relatively flat and wide flexible web to a hook or the like, the combination of: a length of flexible cable having its ends connected end-to-end to form a continuous loop, a longitudinally elongated and laterally narrow member having a passageway at each longitudinal end thereof, said member having longitudinally extending top and bottom portions and lateral sides, a portion of said cable extending through said passageways and therebetween immediately adjacent and engaging said bottom portion, the remainder of said cable forming a loop above the said top portion of the member for engaging the hook, said top portion having a longitudinally straight surface between said passageways, said straight surface being laterally curved to smoothly join each of said sides, and a portion of said flat web encircling the laterally narrow direction of said member and engaging said straight surface in surface contact relation for uniformly transmitting downward force from said web to said member.

10. The combination of claim 9 wherein said sides converge toward each other in a lateral downward direction and the portion of the web encircling said member is attached to itself to form a loop with portions thereof engaging said sides.

11. The combination of claim 10 wherein the longitudinal distance between said passageways is slightly greater than the width of said web for receiving said web and the thickness of said member between said sides is substantially less than said longitudinal distance and more closely approximates the diameter of said cable rather than said longitudinal distance for forming the encircling portion of web into a very flat loop to minimize the forces tending to separate said connection of the web to itself.

12. In an end connection apparatus for a relatively flat and wide web of flexible material, the combination of: a longitudinally elongated and laterally narrow member having a longitudinally extending top portion and a passageway at each longitudinal end thereof, a length of flexible cable having its ends joined end-to-end to form a continuous loop, a portion of said cable positioned in said passageways and engaging said member along the longitudinal extent thereof below said top portion, said top portion having a longitudinally straight surface at least equal in length to the width of said web, a major portion of said cable loop extending freely above said top portion and between said passageways, and a portion of said flat web encircling the laterally narrow direction of said member and secured to itself to form a loop, the portion of said web loop remote from said connection to itself engaging said longitudinally straight surface on the member in surface contact relation.

13. The combination of claim 11 wherein said bottom portion of the member has an open channel for receiving said cable, said passageways are curved and communicate with said channel, and a swedge joins said ends of the cable length, said swedge being positioned in said channel.

References Cited in the file of this patent

UNITED STATES PATENTS

| | | | |
|---|---|---|---|
| 468,293 | Coleman | Feb. 2, | 1892 |
| 1,028,104 | Fletcher | June 4, | 1912 |
| 1,710,149 | Duffy | Apr. 23, | 1929 |
| 1,970,617 | Morgan | Aug. 21, | 1934 |
| 2,354,280 | Russell | July 25, | 1944 |
| 2,406,607 | Jensen | Aug. 27, | 1946 |
| 2,699,587 | Elsner | Jan. 18, | 1955 |
| 2,793,904 | Gale | May 28, | 1957 |
| 3,048,909 | Sheehan | Aug. 14, | 1962 |
| 3,067,570 | Nischan | Dec. 11, | 1962 |